United States Patent
Lee et al.

(10) Patent No.: US 8,243,872 B2
(45) Date of Patent: Aug. 14, 2012

(54) SPACER GRID FOR CLOSE-SPACED NUCLEAR FUEL RODS

(75) Inventors: Kang-Hee Lee, Daejeon (KR);
Hyung-Kyu Kim, Daejeon (KR);
Kyung-Ho Yoon, Daejeon (KR);
Young-Ho Lee, Daejeon (KR);
Jae-Yong Kim, Daejeon (KR);
Tae-Hyun Chun, Daejeon (KR);
Wang-Kee In, Daejeon (KR);
Dong-Seok Oh, Daejeon (KR);
Chang-Hwan Shin, Gyeonggi-do (KR)

(73) Assignee: Korea Atomic Energy Research Institute, Daejeon (KR)

( * ) Notice: Subject to any disclaimer, the term of this patent is extended or adjusted under 35 U.S.C. 154(b) by 496 days.

(21) Appl. No.: 12/146,493

(22) Filed: Jun. 26, 2008

(65) Prior Publication Data
US 2009/0052607 A1    Feb. 26, 2009

(30) Foreign Application Priority Data

Jun. 26, 2007   (KR) ........................ 10-2007-0062839

(51) Int. Cl.
*G21C 3/34*    (2006.01)
(52) U.S. Cl. ........................ 376/438; 376/442
(58) Field of Classification Search ........... 376/438–442
See application file for complete search history.

(56) References Cited

U.S. PATENT DOCUMENTS

| | | | |
|---|---|---|---|
| 4,007,899 A | 2/1977 | Piepers et al. | |
| 4,181,571 A | 1/1980 | Jolly | |
| 4,594,216 A * | 6/1986 | Feutrel | 376/442 |
| 4,897,241 A * | 1/1990 | Anthony | 376/438 |
| 5,024,810 A | 6/1991 | Bachman | |
| 5,110,539 A | 5/1992 | Perrotti et al. | |
| 5,243,635 A * | 9/1993 | Bryan | 376/442 |
| 5,307,392 A * | 4/1994 | Bryan | 376/442 |
| 5,307,393 A * | 4/1994 | Hatfield | 376/442 |
| 5,350,161 A * | 9/1994 | Perrotti | 267/160 |
| 5,434,898 A * | 7/1995 | Barkhurst | 376/438 |
| 2008/0232537 A1 * | 9/2008 | Reparaz et al. | 376/438 |

FOREIGN PATENT DOCUMENTS
JP    07-198884    8/1995
* cited by examiner

*Primary Examiner* — Ricardo Palabrica
(74) *Attorney, Agent, or Firm* — Bachman & LaPointe, P.C.

(57) ABSTRACT

A spacer grid can be applied to close-spaced nuclear fuel rods. The spacer grid is directed to solve the problem in which, as the outer diameter of each nuclear fuel rod increases due to the use of dual-cooled nuclear fuel rods for improving cooling performance and obtaining high combustion and high output power, the gap between the neighboring nuclear fuel rods is narrowed to thus make it impossible to use an existing spacer grid. The spacer grid is a combination of unit grid straps, each of which has supports for supporting each of the nuclear fuel rods set in a narrow array and has a sheet shape, which are combined with each other. The supports are located at positions shifted from the longitudinal central line of each unit grid strap toward sub-channels.

7 Claims, 9 Drawing Sheets

SPACER GRID FOR CLOSE-SPACED NUCLEAR FUEL RODS

BACKGROUND OF THE INVENTION

1. Field of the Invention

The present invention relates to a spacer grid for supporting nuclear fuel rods of a nuclear fuel assembly charged into a nuclear reactor and, more particularly, to a spacer grid for more close-spaced nuclear fuel rods than conventional ones, in which the supports of each grid strap are located at positions shifted from a central line of each grid strap toward a center of a sub-channel in order to accommodate a reduced gap between the nuclear fuel rods due to the use of dual-cooled nuclear fuel rods, which have excellent cooling performance.

2. Description of the Prior Art

Figure 1:
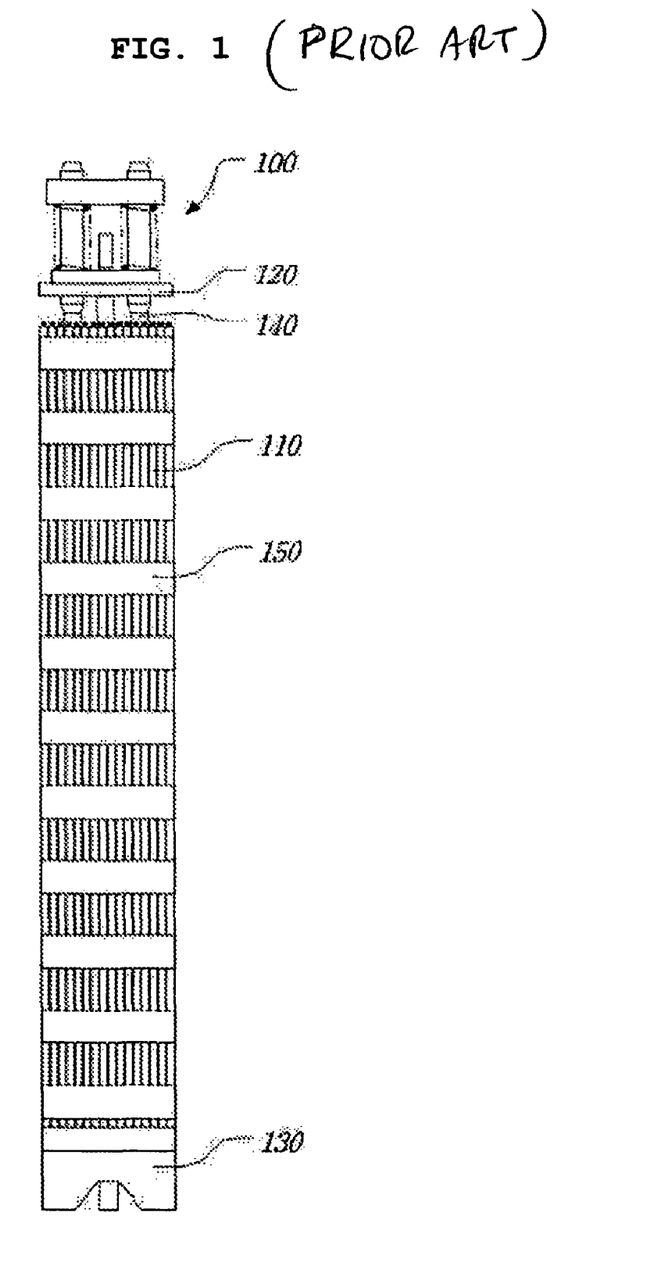
FIG. 1 is a perspective view schematically illustrating a conventional nuclear fuel assembly.
Figure 2:
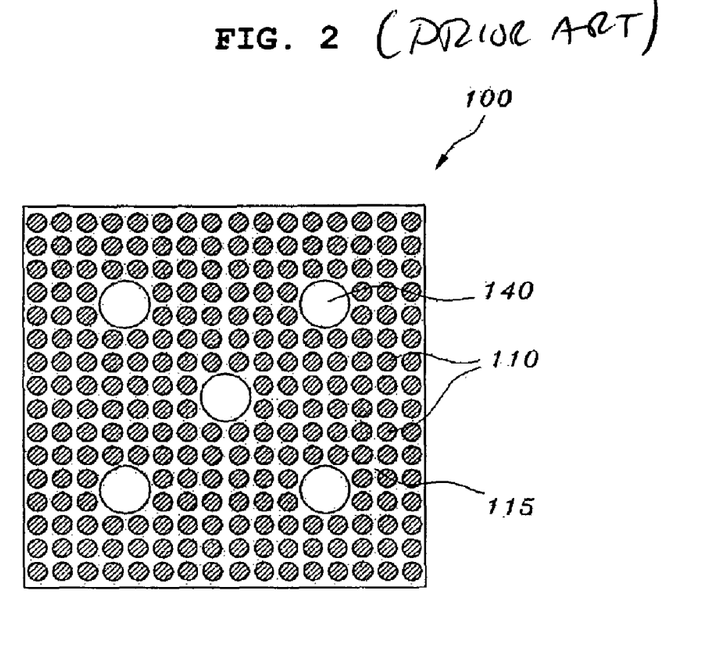
FIG. 2 is a cross-sectional view schematically illustrating a conventional nuclear fuel assembly.
Figure 3:
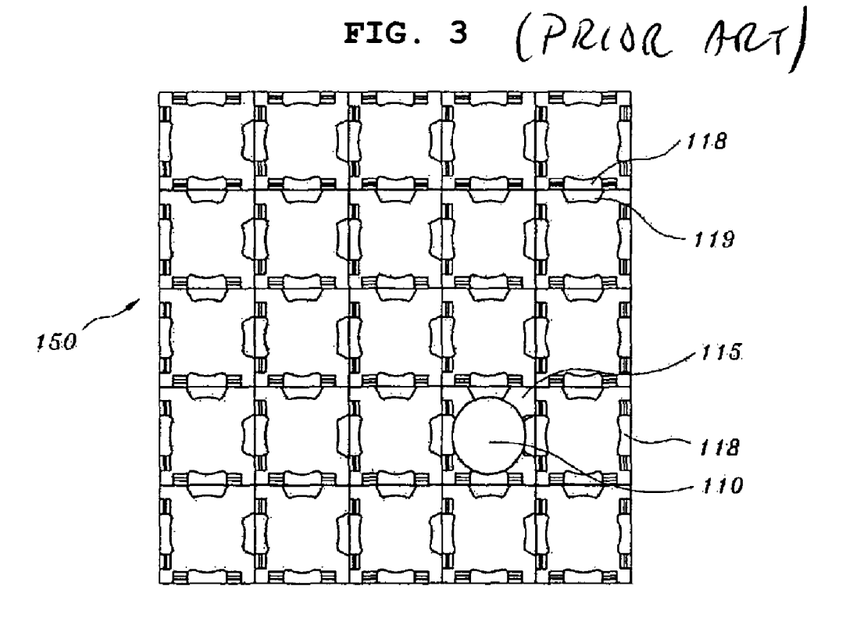
FIG. 3 is a top plane view schematically illustrating a spacer grid applied to a conventional nuclear fuel assembly.
Figure 4:
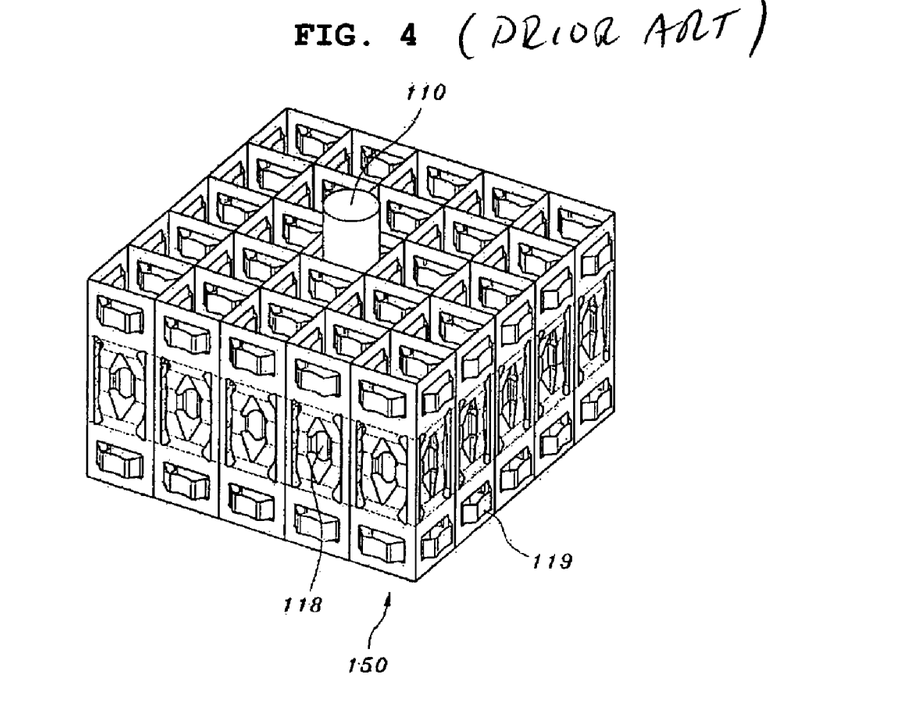
FIG. 4 is a perspective view schematically illustrating a spacer grid applied to a conventional nuclear fuel assembly.
Figure 5:
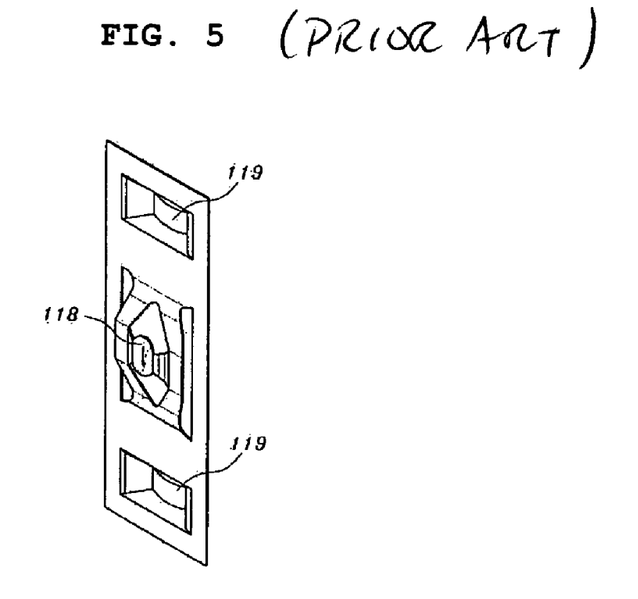
FIG. 5 is a perspective view schematically illustrating a unit grid strap for a spacer grid supporting a conventional nuclear fuel assembly.

FIG. 1 is a perspective view schematically illustrating a conventional nuclear fuel assembly. FIG. 2 is a cross-sectional view schematically illustrating a conventional nuclear fuel assembly. FIG. 3 is a top plane view schematically illustrating a spacer grid applied to a conventional nuclear fuel assembly. FIG. 4 is a perspective view schematically illustrating a spacer grid applied to a conventional nuclear fuel assembly. FIG. 5 is a perspective view schematically illustrating a unit grid strap for a spacer grid supporting a conventional nuclear fuel assembly.

As illustrated in the figures, the conventional nuclear fuel assembly 100 comprises nuclear fuel rods 110, guide tubes 140, spacer grids 150, a top end piece 120, and a bottom end piece 130.

Here, each nuclear fuel rod 110 has a cylindrical uranium sintered compact in a clad pipe of zircaloy (zirconium alloy). This uranium sintered compact is fissioned to generate high temperature heat.

Meanwhile, each guide tube 140 is used as a passage for a control rod, which moves up and down in order to control the output power of a reactor core and to stop the fission reaction. The spacer grid 150 is one of the components constituting the nuclear fuel assembly in a nuclear reactor, and includes a plurality of unit grid straps, each of which has a spring 118 and dimples 119 and functions to support and protect the nuclear fuel rods 110 so that they are arranged at designated positions. When the spring force of the spring 118 and the dimples 119 is too weak, each nuclear fuel rod 110 cannot be arranged at a designated position, and thus has a possibility of losing sound supporting performance. In contrast, when the spring force of the spring 118 and the dimples 119 is too strong, each nuclear fuel rod 110 undergoes defects such as scratching on the surface of the clad tube due to excessive frictional gripping force when it is inserted into the spacer grid. Further, during the operation of the nuclear reactor, the nuclear fuel rods 110 experience longitudinal growth by means of the irradiation of neutrons. This longitudinal growth is not properly accommodated, and thus the nuclear fuel rods 110 are bent. In this manner, when the nuclear fuel rods 110 are bent, they come nearer to or contact neighboring nuclear fuel rods 110. Thus, the coolant channel between the nuclear fuel rods becomes narrow or is blocked. As a result, the heat generated from the nuclear fuel rods is not effectively transmitted to the coolant, thereby increasing the temperature of the nuclear fuel rods. As such, the possibility of generating Departure from Nucleate Boiling (DNB) is increased, which is mainly responsible for the reduction of nuclear fuel output power.

The top end piece 120 and the bottom end piece 130 fixedly support the nuclear fuel assembly 100 on upper and lower structures of the reactor core. The bottom end piece 130 includes a screening device (not shown) for filtering foreign materials floating in the reactor core.

Meanwhile, each spacer grid 150 is usually made of zircaloy, and includes nuclear fuel rod cells, which support the nuclear fuel rods 110, and guide tube cells, into which the guide tubes 140 are inserted. Each nuclear fuel rod cell is designed to support each nuclear fuel rod 110 at a total of six supporting points using a total of two grid springs 118, which are located on two respective faces, and a total of four dimples 119, which are located in pairs above and below the two grid springs 118 and on the other two respective faces.

A cylindrical uranium dioxide compact is inserted into each nuclear fuel rod 110, and the coolant rapidly flows from the bottom to the top of the reactor core in an axial direction through sub-channels 115, each of which is enclosed by four nuclear fuel rods 110 or by three nuclear fuel rods 110 and one guide tube 140.

Here, each sub-channel 115 refers to a space enclosed by the nuclear fuel rods 110, and particularly a passage through which a fluid can freely flow to the neighboring sub-channel because it has an open side.

Figure 6:
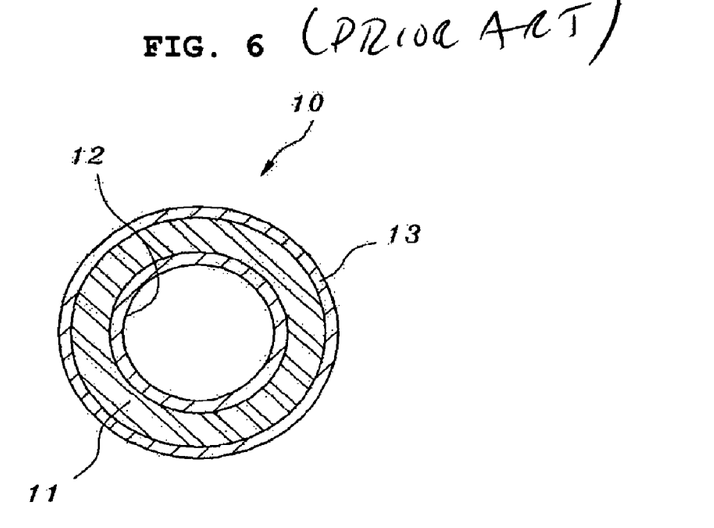
FIG. 6 is a top plane view schematically illustrating a dual-cooled nuclear fuel rod applied to the present invention.
Figure 7:
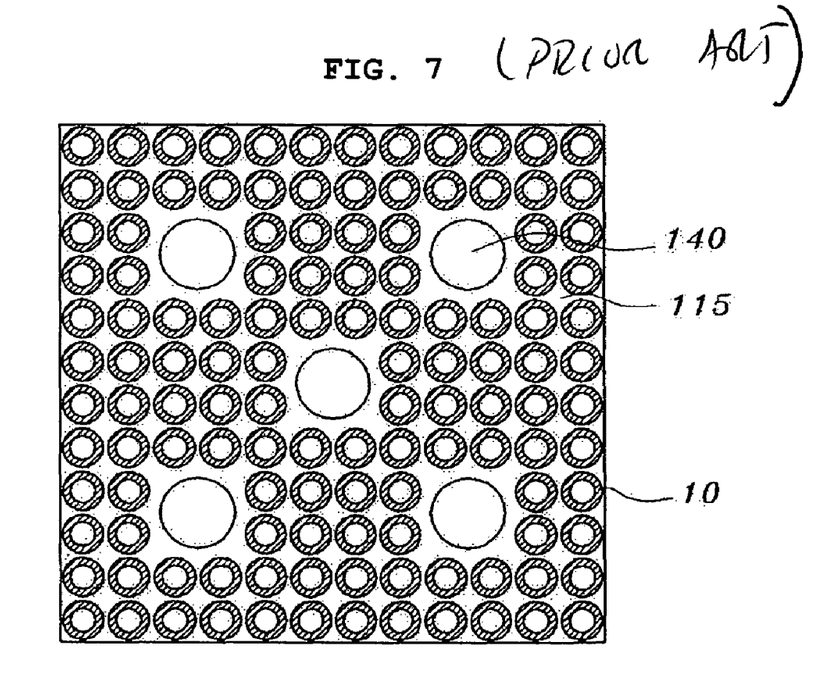
FIG. 7 is a cross-sectional view schematically illustrating a nuclear fuel assembly for dual-cooled nuclear fuel rods applied to the present invention.

Meanwhile, as illustrated in FIGS. 6 and 7, a dual-cooled nuclear fuel rod 10 having an annular structure instead of the cylindrical nuclear fuel rod 110 is disclosed in U.S. Pat. Nos. 3,928,132 and 6,909,765.

Here, the dual-cooled nuclear fuel rod 10 having an annular structure includes a sintered compact 11 having an annular shape, an inner clad tube 12 enclosing the inner circumference of the sintered compact 11, and an outer clad tube 13 enclosing the outer circumference of the sintered compact 11. Thus, the coolant flows outside and inside the dual-cooled nuclear fuel rod 10, so that heat transfer is doubled. As a result, the dual-cooled nuclear fuel rod 10 can maintain a low fuel's centerline temperature, and provide high combustion and high output power.

In this manner, in the case in which the centerline temperature of the dual-cooled nuclear fuel rod 10 is maintained low, the possibility of damaging the fuel due to an increase in the core temperature of the nuclear fuel is lowered, so that the safety allowance of the dual-cooled nuclear fuel rod 10 can be increased.

However, in order to make the dual-cooled nuclear fuel rods 10 structurally compatible with an existing pressurized water reactor (PWR) core, the gap between the nuclear fuel rods becomes considerably narrower compared to that between existing nuclear fuel rods because the positions of the guide tubes 140 cannot be changed in the nuclear fuel assembly 100, and because the outer diameter of each nuclear fuel rod is increased. For example, in the case in which the nuclear fuel assembly is formed according to a candidate design draft for the dual-cooled nuclear fuel rods having a 12×12 array, the gap between the nuclear fuel rods is reduced from 3.35 mm, which is the size of the existing gap, to about 1.24 mm.

Thus, due to the narrow gap between the nuclear fuel rods, the spacer grid that has been developed to date cannot be used as that for the dual-cooled nuclear fuel rods 10.

In other words, after the thickness of the unit grid strap of the existing spacer grid, which is 0.475 mm, is subtracted from the gap of 1.24 mm between the nuclear fuel rods, the obtained result is again divided by two. Consequently, the gap between the unit grid strap and the nuclear fuel rod is no more than about 0.383 mm. Thus, it is impossible to apply such a shape and a supporting position as in an existing leaf spring within this narrow gap to design a spring having spring rigidity and hydraulic characteristic (mainly pressure loss), which an existing supporting structure has.

SUMMARY OF THE INVENTION

Accordingly, the present invention has been made keeping in mind the above problems occurring in the prior art, and an object of the present invention is to provide a spacer grid, capable of sound supporting nuclear fuel rods set in a narrow array, unlike an existing spacer grid, which has a problem in which, as the outer diameter of each nuclear fuel rod increases due to the use of dual-cooled nuclear fuel rods for improving cooling performance and obtaining high combustion and high output power, the gap between neighboring nuclear fuel rods is narrowed to thus make it impossible to use the existing spacer grid.

In order to achieve the above object, according to one aspect of the present invention, there is provided a spacer grid for close-spaced nuclear fuel rods, in which a plurality of unit grid straps, each of which has supports for supporting each of the nuclear fuel rods set in a narrow array and has a sheet shape, are combined with each other. The supports are located at positions shifted from the longitudinal central line of each unit grid strap toward sub-channels.

Here, each support may have a cantilever leaf spring shape, a semi-spherical or elliptical shape, or a semi-cylindrical shape in the longitudinal direction of the unit grid strap.

Further, the supports may be formed at the front and rear of each unit grid strap in symmetry based on the longitudinal central line of each unit grid strap.

Also, the cantilever leaf spring may include a protrusion, which protrudes from the unit grid strap toward the dual-cooled nuclear fuel rod, and an extension, which extends from the protrusion so as to enclose the outer circumference of the dual-cooled nuclear fuel rod.

Further, the extension may have the same curvature as the outer circumference of the dual-cooled nuclear fuel rod, and the protrusion may have a radius of curvature smaller than that of the extension.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Reference will now be made in greater detail to exemplary embodiments of the invention, which are illustrated in the accompanying drawings. Wherever possible, the same reference numerals will be used throughout the drawings and the description to refer to the same or like parts.

Figure 8:
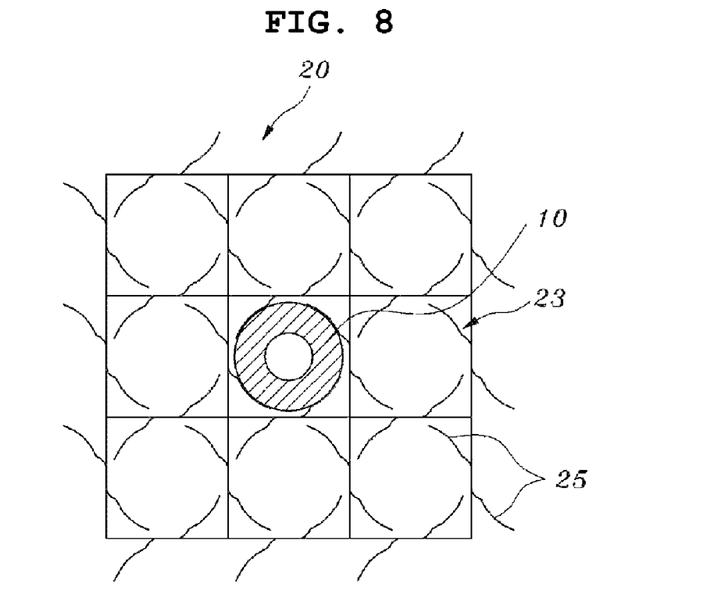
FIG. 8 is a top plane view illustrating a spacer grid having a cantilever leaf spring support according to the present invention.

According to an exemplary embodiment of the present invention, a spacer grid 20 supports dual-cooled nuclear fuel rods 10 having a 3×3 array, which is taken as an example.

Figure 9:
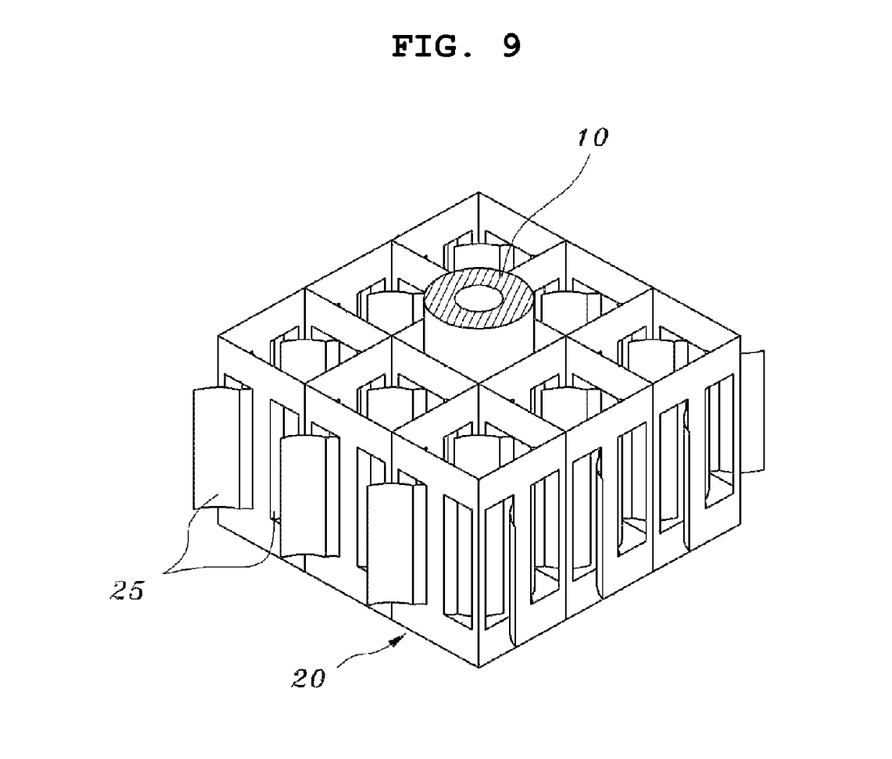
FIG. 9 is a perspective view illustrating a spacer grid having a cantilever leaf spring support according to the present invention.
Figure 10:
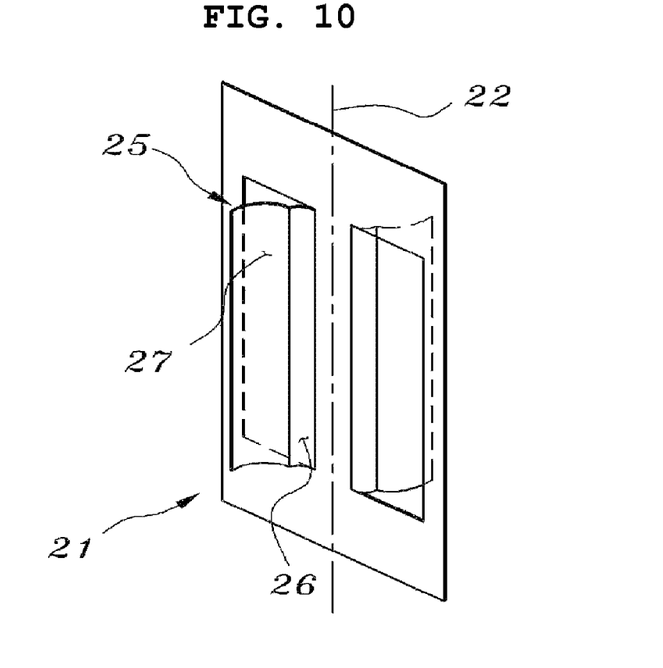
FIG. 10 is a perspective view illustrating a unit grid strap having a cantilever leaf spring support according to the present invention.

FIGS. 8 through 10 illustrate a spacer grid according to a first embodiment of the present invention. FIG. 8 is a top plan view illustrating a spacer grid having a cantilever leaf spring support, FIG. 9 is a perspective view illustrating a spacer grid having a cantilever leaf spring support, and FIG. 10 is a perspective view illustrating a unit grid strap having a cantilever leaf spring support.

The spacer grid 20 of the present invention is a combination of unit grid straps 21, each of which has supports 23 for supporting a dual-cooled nuclear fuel rod 10 by coming into contact with the outer circumference of the dual-cooled nuclear fuel rod 10, and has a sheet shape. The dual-cooled nuclear fuel rod 10 includes a sintered compact 11 having an annular shape, an inner clad tube 12 enclosing the inner circumference of the sintered compact 11, and an outer clad tube 13 enclosing the outer circumference of the sintered compact 11.

In particular, each support 23 is located at a position shifted from the longitudinal central line 22 of each unit grid strap 21 toward a sub-channel 115 so as to support the outer circumference of the dual-cooled nuclear fuel rod 10.

Here, the sub-channel 115 refers to a space enclosed by four dual-cooled nuclear fuel rods 10 or by three dual-cooled nuclear fuel rods 10 and one guide tube 140. Coolant flows in the axial direction through the sub-channel 115.

Preferably, each support 23 has the shape of a cantilever leaf spring 25, and has a predetermined radius of curvature along the outer circumference of the dual-cooled nuclear fuel rod 10 so as to be able to come into surface contact with the dual-cooled nuclear fuel rod 10.

To this end, each support 23 includes a protrusion 26, which protrudes from the unit grid strap 21 toward the dual-cooled nuclear fuel rod 10, and an extension 27, which extends from the protrusion 26 so as to enclose the outer circumference of the dual-cooled nuclear fuel rod 10.

In other words, the protrusion 26 and the extension 27 are integrally formed with each other by cutting the unit grid strap 21 in a "C" shape at a position shifted from the longitudinal central line 22 of each unit grid strap 21 toward the center of the sub-channel 115, and by bending the cut piece.

At this time, the extension 27 is preferably formed so as to have the same radius of curvature as the outer circumference of the dual-cooled nuclear fuel rod 10 for surface contact with the dual-cooled nuclear fuel rod 10. It is advantageous in view of the rigidity of the spring that the protrusion 26 be formed so as to have an arcuate shape having a predetermined radius of curvature smaller than that of the extension 27.

Further, the supports 23 are formed at the front and rear of each unit grid strap 21, respectively. The front support 23 and the rear support 23 are in axial symmetry based on the longitudinal central line 22 of each unit grid strap 21. In detail, the front support 23 is adapted to support the dual-cooled nuclear fuel rod 10, which is located at the front of each unit grid strap 21, and the rear support 23 is adapted to support the dual-cooled nuclear fuel rod 10, which is located at the rear of each unit grid strap 21. Thus, the dual-cooled nuclear fuel rod 10 is supported at a total of four positions by the four unit grid straps 21 enclosing one dual-cooled nuclear fuel rod 10.

The supports 23 are formed at the front and rear of each unit grid strap 21 so as to have axial symmetry based on the longitudinal central line 22 of each unit grid strap 21, so that they can avoid structural interference or loss of the function as a spring. When formed by a pressing process, the supports 23 minimize disorientation (or flexure) caused by residual strain and residual stress, and are complementarily deformed.

Further, the supports 23, having the shape of the cantilever leaf spring 25 formed at the front and rear of each unit grid strap 21, are preferably spaced apart from each other at a predetermined interval so as to be able to maintain proper rigidity when functioning as the spring supporting the dual-cooled nuclear fuel rod 10.

Figure 11:
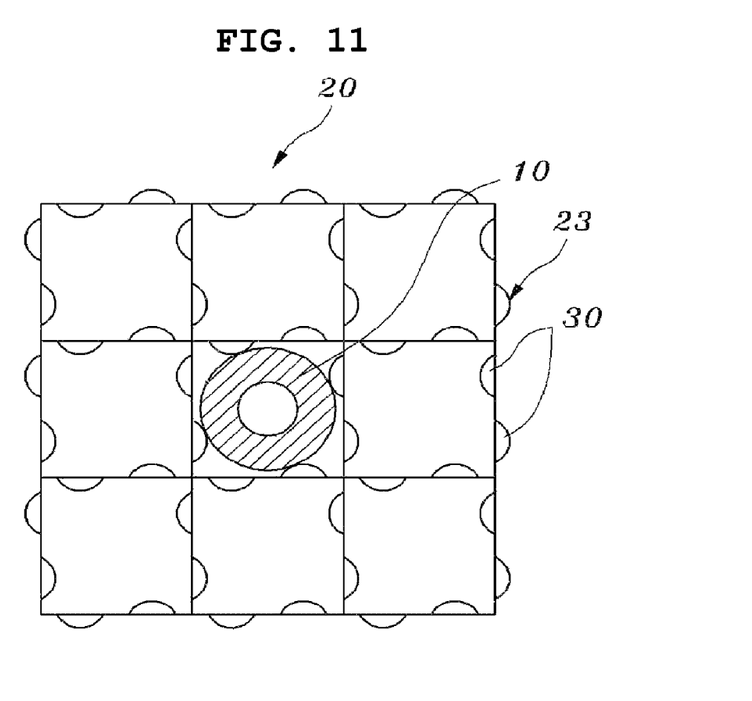
FIG. 11 is a top plane view illustrating a spacer grid having semi-spherical supports according to the present invention.
Figure 12:
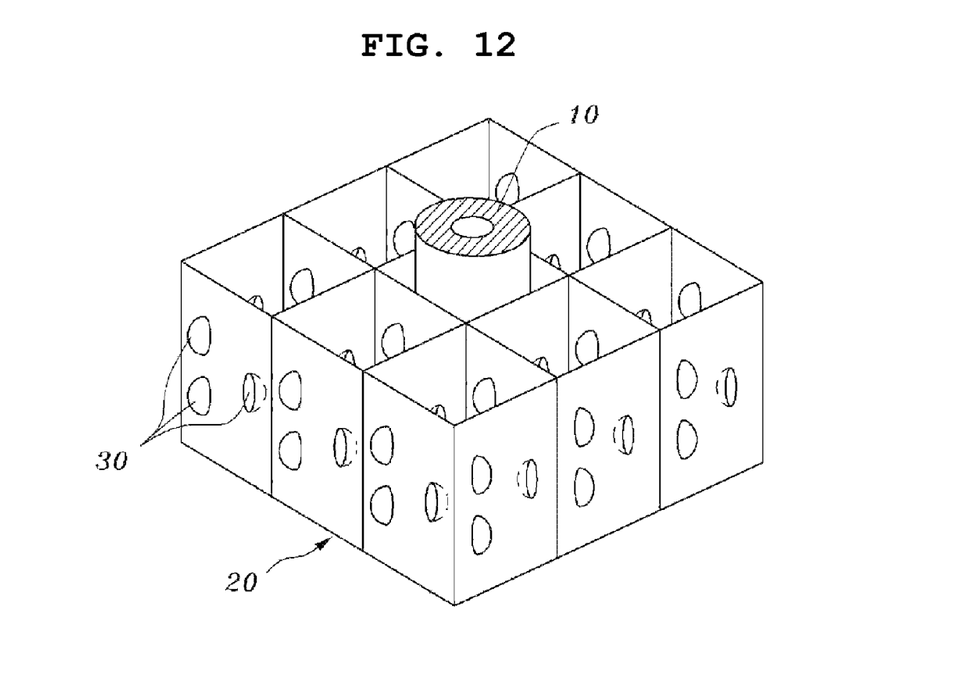
FIG. 12 is a perspective view illustrating a spacer grid having semi-spherical supports according to the present invention.
Figure 13:
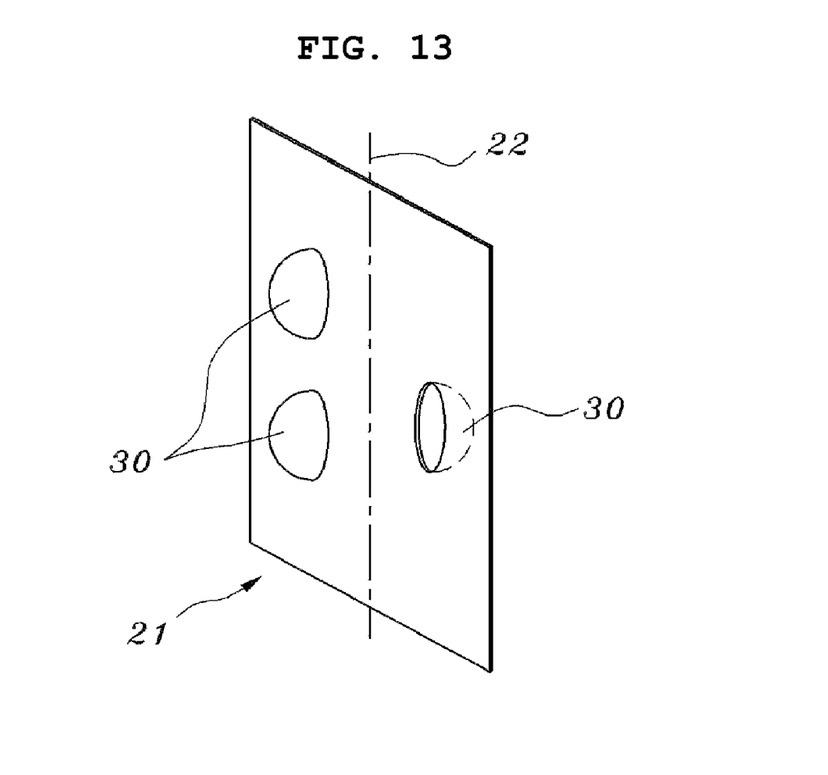
FIG. 13 is a perspective view illustrating a unit grid strap having semi-spherical supports according to the present invention.

FIGS. 11 through 13 illustrate a spacer grid according to a second embodiment of the present invention. FIG. 11 is a top plan view illustrating a spacer grid having semi-spherical shape supports, FIG. 12 is a perspective view illustrating a spacer grid having semi-spherical supports, and FIG. 13 is a perspective view illustrating a unit grid strap having semi-spherical supports.

The shape of each dual-cooled nuclear fuel rod 10 and the position of each support 30 are the same as in the first embodiment of the present invention. However, the shape of each support 30 is different from that of the first embodiment of the present invention. Thus, only the shape of each support 30 will be described in detail.

The spacer grid 20 according to a second embodiment of the present invention includes at least one semi-spherical support 30 at a position shifted from the longitudinal central line 22 of each unit grid strap 21 toward the center of each sub-channel 115. The semi-spherical supports 30 are formed in a semi-spherical or elliptical shape, and protrude from the front and rear of each unit grid strap 21.

At this time, preferably, among the semi-spherical supports 30 having the semi-spherical or elliptical shape, two are formed at the front of the unit grid strap 21 in a vertical direction, and one is formed at the rear of the unit grid strap 21.

Alternatively, the semi-spherical supports 30 protruding from the front and rear of the unit grid strap 21 may be formed such that one thereof is located at each of the front and rear of the unit grid strap 21 so as to be in axial symmetry based on the longitudinal central line 22 of the unit grid strap 21. Thereby, when formed by a pressing process, the semi-spherical supports 30 minimize disorientation caused by residual strain and residual stress, and are complementarily deformed.

Thus, the dual-cooled nuclear fuel rod 10 can be supported at a total of four positions by the semi-spherical supports 30, which are formed on the four unit grid straps 21 enclosing one dual-cooled nuclear fuel rod 10.

Figure 14:
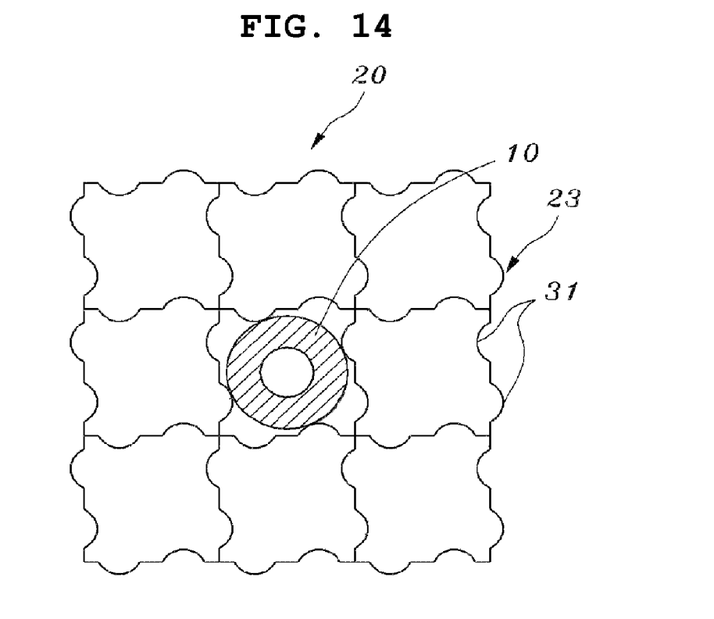
FIG. 14 is a top plan view illustrating a spacer grid having semi-cylindrical supports according to the present invention.
Figure 15:
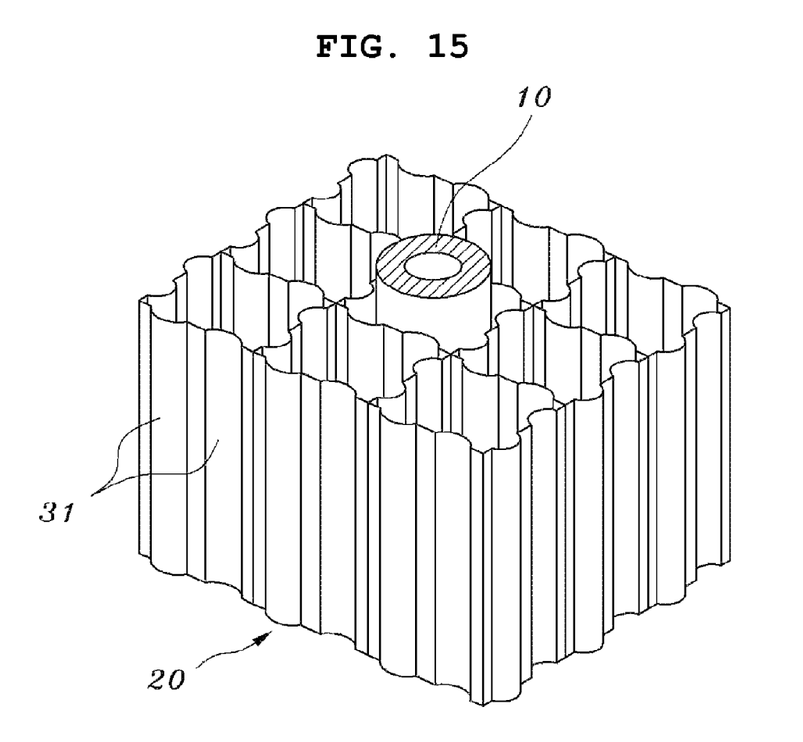
FIG. 15 is a perspective view illustrating a spacer grid having semi-cylindrical supports according to the present invention.
Figure 16:
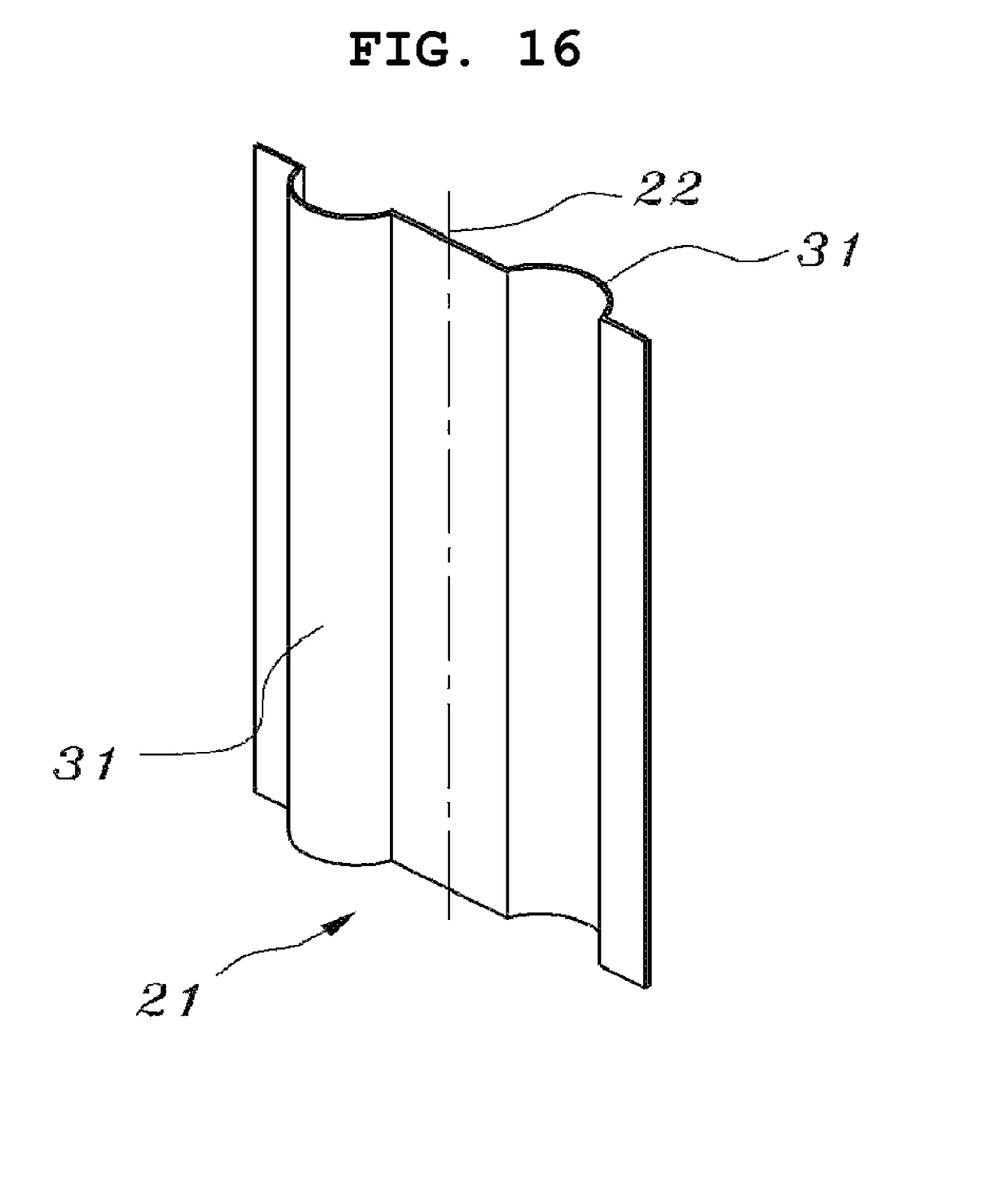
FIG. 16 is a perspective view illustrating a unit grid strap having semi-cylindrical supports according to the present invention.

FIGS. 14 through 16 illustrate a spacer grid according to a third embodiment of the present invention. FIG. 14 is a top plan view illustrating a spacer grid having semi-cylindrical supports, FIG. 15 is a perspective view illustrating a spacer grid having semi-cylindrical supports, and FIG. 16 is a perspective view illustrating a unit grid strap having semi-cylindrical supports.

The shape of each dual-cooled nuclear fuel rod 10 and the position of each support 31 are the same as in the first and second embodiments of the present invention. However, the shape of each support 31 is different from that of the first embodiment of the present invention. Thus, only the shape of each support 31 will be described in detail.

The spacer grid 20 according to a third embodiment of the present invention includes semi-cylindrical supports 31 at positions shifted from the longitudinal central line 22 of each unit grid strap 21 toward the sub-channels 115. The semi-cylindrical supports 30 protrude from the front and rear of each unit grid strap 21.

Similarly, the semi-cylindrical supports 31 are preferably formed at the front and rear of the unit grid strap 21 so as to be in axial symmetry based on the longitudinal central line 22 of the unit grid strap 21. Thereby, when formed by a pressing process, the semi-cylindrical supports 31 minimize disorientation caused by residual strain and residual stress, and are complementarily deformed.

Thus, the dual-cooled nuclear fuel rod 10 is supported at a total of four positions by the semi-cylindrical supports 31, which protrude from the four unit grid straps 21 enclosing one dual-cooled nuclear fuel rod 10.

As described above, the dual-cooled nuclear fuel rods 10, arrayed at narrow intervals, are supported by the spacer grid 20 having the supports 23, which are located at the positions shifted from the longitudinal central line 22 of each unit grid strap 21 toward the sub-channels 115, so that the dual-cooled nuclear fuel rods can be stably supported despite the narrow intervals.

Moreover, it is not necessary to change the positions of the guide tubes 140 in the nuclear fuel assembly 100, and the top end piece 120 and the bottom end piece 130 can be used as they are. Thus, the spacer grid can be more compatible with the constituents of an existing nuclear fuel assembly 100.

Further, the supports 23 are formed into cantilever leaf springs 25, so that they can come into surface contact with the dual-cooled nuclear fuel rod 10, thereby inhibiting fretting attrition from being generated by vibration of the nuclear fuel rods which is caused by flow of the coolant.

Moreover, the present invention can be applied to a piping system for transporting fluids and its supporting structures, and ordinary industrial machinery using boilers or heat exchangers. For example, when elongate rods or pipes are arranged at narrow intervals, the present invention is used as one of the shapes of the supports for supporting these rods and pipes.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A spacer grid assembly for dual cooled nuclear fuel rods, comprising a plurality of unit grid straps defining spaces for the dual cooled nuclear fuel rods, wherein each of the unit grid straps has supports including cantilever leaf springs for supporting each of the dual cooled nuclear fuel rods set in an array and has a sheet shape, wherein each unit grid strap has a front side which defines a portion of one space for a dual cooled nuclear fuel rod, and a rear side which defines a portion of an adjacent space for a dual cooled nuclear fuel rod, the supports being located at positions shifted from a longitudinal central line of each unit grid strap toward corners defined by intersecting unit grid straps, wherein the cantilever leaf springs are formed on the front and the rear sides of each unit grid strap in symmetry based on the longitudinal central line of the unit grid strap, wherein each cantilever leaf spring includes a protrusion which protrudes from the unit grid strap toward the dual cooled nuclear fuel rod, and an extension which extends from the protrusion so as to enclose an outer circumference of the dual cooled nuclear fuel rod, wherein the extension has a curvature prior to insertion of the dual cooled nuclear fuel rods which is equal to that of the outer circumference of the dual cooled nuclear fuel rod.

2. The spacer grid as claimed in claim 1, wherein the protrusion has a radius of curvature smaller than that of the extension.

3. The spacer grid as claimed in claim 1, wherein each support protrudes in a semi-spherical shape.

4. The spacer grid as claimed in claim 1, wherein each support protrudes in an elliptical shape.

5. The spacer grid as claimed in claim 1, wherein each support protrudes in a longitudinal direction of each unit grid strap in a semi-cylindrical shape.

6. The spacer grid as claimed in any one of claims 3 through 5, wherein the supports are formed at a front and rear of each unit grid strap in symmetry based on the longitudinal central line of each unit grid strap.

7. The spacer grid as claimed in claim 3 or 4, wherein among the supports, two are formed at a front of each unit grid strap in a vertical direction, and one is formed at a rear of each unit grid strap.

* * * * *